United States Patent Office 3,117,996
Patented Jan. 14, 1964

3,117,996
BIS(FLUOROALKYLIDENE)AZINES AND PROCESS OF PREPARATION
William J. Chambers, Claymont, Del., assignor to E. I. du Pont de Nemours and Company, Wilmington, Del., a corporation of Delaware
No Drawing. Filed July 5, 1960, Ser. No. 40,507
13 Claims. (Cl. 260—566)

This invention relates to a new class of organic compounds containing nitrogen and fluorine. More particularly, it relates to, and has as its principal objects provision of novel polyfluorinated azines and a method for preparing the same.

In spite of the continuously increasing technical interest in highly fluorinated organic compounds, there are no reports in the chemical literature of azines (that is, compounds characterized by the presence of the azino group =N—N=) in which the nitrogen atoms bear polyfluorinated substituents. Such compounds appear to be wholly unknown, with the exception that bis(perfluoroethylidene)azine, $CF_3CF=N—N=CFCF_3$, has been mentioned by Attaway et al., in J. Am. Chem. Soc. 81, 3601 (1959), as a hypothetical intermediate in the fluorination of trifluoroacetonitrile to perfluoroazoethane.

The new compounds made available by this invention are the bis(fluoroalkylidene)azines of the general formula X—CF=N—N=CF—X, where X is a perfluoroalkyl or ω-hydroperfluoroalkyl radical of at least two carbon atoms.

The terms used above have their normal significance, i.e., a perfluoroalkyl radical is an alkyl radical containing only carbon and fluorine atoms, and an ω-hydroperfluoroalkyl radical is an alkyl radical containing only carbon and fluorine atoms and one hydrogen atom, this hydrogen atom being at the end of the chain.

The above-defined bis(fluoroalkylidene)azines are prepared by maintaining in contact at a temperature above about 15° C. and until reaction has taken place a mixture of a metal carbonyl and a fluoroazoalkane of the formula X—CF₂—N=N—CF₂—X, where X is a perfluoroalkyl or ω-hydroperfluoroalkyl radical of at least two carbon atoms.

The reaction which takes place is represented by the following equation, using nickel tetracarbonyl as the illustrative metal carbonyl:

X—CF₂—N=N—CF₂—X+Ni(CO)₄
→X—CF=N—N=CF—X+NiF₂+4CO showing that two fluorine atoms are removed from the fluoroazoalkane with formation of the corresponding bis(fluoroalkylidene)azine, metal fluoride and carbon monoxide. More generally, when using a metal carbonyl $M_x(CO)_y$ which is converted to a metal fluoride $MF_z$, the reaction may be expressed by the equation:

$p$(X—CF₂—N=N—CF₂—X)+$qM_x(CO)_y$
→$p$(X—CF=N—N=CF—X)+$q_xMF_z$+$qy$CO where $p$ and $q$ represent the moles of fluoroazoalkane and metal carbonyl, respectively, and the arithmetical relation between these two numbers is $$q = \frac{2p}{xz}$$

Any metal carbonyl can be used in the process of this invention. These materials, which are viewed as coordination compounds of a metal atom with a variable number of carbon monoxide molecules, are either available commercially or obtainable by published methods. The best known metal carbonyls are those derived from metals of groups VI-B, VII-B, and VIII of the periodic table (the periodic table referred to here is that published in Deming's "General Chemistry," 5th ed., John Wiley & Sons, Inc., publishers, and used in many other reference books such as the Handbook of Chemistry and Physics, 30th ed. (1947), published by the Chemical Rubber Publishing Co.). Suitable metal carbonyls include, e.g., $Cr(CO)_6$; $Mo(CO)_6$; $W(CO)_6$; $[Mn(CO)_5]_2$
$[Re(CO)_5]_2$; $Fe(CO)_5$; $[Fe(CO)_4]_3$; $Ru(CO)_5$
$Ru_2(CO)_9$; $Os(CO)_5$; $[Co(CO)_4]_2$; $[Co(CO)_3]_4$
$[Rh(CO)_4]_2$; $[Ir(CO)_4]_2$; and $Ni(CO)_4$ The most common metal carbonyls are those of the elements in group VIII having atomic numbers 26–28 (Fe, Co and Ni) and these are preferred materials in the process of this invention.

The other starting material is a polyfluoroazoalkane of the formula X—CF₂—N=N—CF₂—X, where X is a perfluoroalkyl or an ω-hydroperfluoroalkyl radical of at least two carbon atoms.

These polyfluoroazoalkanes are best prepared by a process which consists in reacting, at a temperature within the range of 25° to 250° C., a nitrile of the formula X—CN, where X is a perfluoroalkyl or ω-hydroperfluoroalkyl radical, with a halogen of atomic number 17–35 (chlorine or bromine) and a fluoride of a metal of the group of sodium, potassium, rubidium, cesium, copper, silver, mercury and lead. This reaction is represented by the following equation, using silver(I) fluoride and chlorine as the illustrative inorganic reactants:

2X—CN+2Cl₂+4AgF→X—CF₂
—N=N—CF₂—X+4AgCl

The most accessible, and therefore preferred, polyfluoroazoalkanes for use in the process of this invention are those in which X in the general formula

X—CF₂—N=N—CF₂—X is a perfluoroalkyl or ω-hydroperfluoroalkyl radical of 2–12 carbon atoms, i.e., those in which the polyfluoroalkyl radicals attached to the nitrogen atoms have from 3–13 carbon atoms.

There are given below for guidance several examples describing in detail the preparation of representative polyfluoroazoalkanes suitable for use in the process of this invention.

A. PERFLUOROAZOPROPANE

A mixture of 30 g. of perfluoropropionitrile, $C_2F_5CN$, 75 g. of silver(I) fluoride and 40 g. of bromine was heated at 100° C. for 1 hour, then at 160° C. for 3 hours under autogenous pressure. Distillation of the volatile reaction product gave 8 g. of a yellow-green liquid, B.P. 68–71° C., which was shown by nuclear magnetic resonance and elemental analysis to be perfluoroazopropane, $C_3F_7N=NC_3F_7$.

*Analysis.*—Calc'd for $C_6F_{14}N_2$: C, 19.67; F, 72.68; N, 7.65. Found: C, 19.90; F, 71.93; N, 8.03.

There was also obtained 1 g. of N-bromo(perfluoropropylidene)imine, $C_2F_5-CF=NBr$, B.P. 55-61° C.

B. PERFLUOROAZOBUTANE

A mixture of 30 g. of perfluorobutyronitrile, 40 g. of silver(I) fluoride (mole ratio $AgF/C_3F_7CN$ 2:1) and 20 g. of bromine was heated at 100° C. for 1 hour and 160° C. for 2 hours under autogenous pressure. Distillation of the volatile reaction product gave 8 g. of N-bromo (perfluorobutylidene)imine, $C_3F_7-CF=NBr$, B.P. 75–77° C., and 9 g. of perfluoroazobutane, $C_4F_9N=NC_4F_9$, B.P. 100–112° C. On redistillation, perfluoroazobutane was obtained as a yellow-green liquid boiling at 113° C. at 760 mm., and identified by nuclear magnetic resonance and elemental analysis.

*Analysis.*—Calc'd for $C_8F_{18}N_2$: F, 73.40. Found: F, 72.76.

When this experiment was repeated, but with different proportions of reactants (50 g. $C_3F_7CN$, 98 g. AgF, 50 g. $Br_2$, mole ratio $AgF/C_3F_7CN$ 3:1), perfluoroazobutane was the principal reaction product (84% conversion).

C. PERFLUOROAZOOCTANE

The starting material in this example was perfluorooctanenitrile, $C_7F_{15}CN$, prepared by heating with phosphoric anhydride the ammonium salt of perfluorooctanoic acid. The acid itself was a commercial sample containing approximately 70% of $CF_3(CF_2)_6COOH$, the remainder consisting of a mixture of the isomeric acids,

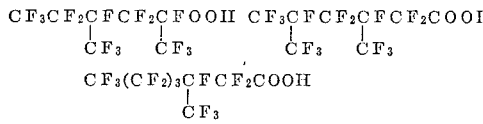

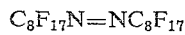

A mixture of 28 g. of perfluorooctanenitrile, 81 g. of silver(I) fluoride and 5 g. of chlorine was heated under autogenous pressure at 100° C. for 1 hour, then at 140° C. for 2 hours. The total reaction product was removed from the bomb and heated at 155° C. under 0.35 mm. pressure to recover the volatile material. There was thus obtained 22 g. of a liquid which solidified to a low melting solid. Redistillation of this product gave 20 g. (65% conversion) of a yellow-green, low melting solid boiling at 67–75° C. at 0.2 mm. pressure, which was shown by elemental analysis to be perfluoroazooctane, $$C_8F_{17}N=NC_8F_{17}$$

*Analysis.*—Calc'd for $C_{16}F_{34}N_2$: C, 22.17; F, 74.60, Found: C, 22.31; F, 74.50.

D. ω-HYDROPERFLUOROAZOPROPANE

A mixture of 18 g. of 2,2,3,3-tetrafluoropropanenitrile, $HCF_2CF_2CN$, 60 g. of silver(I) fluoride and 11 g. of chlorine was heated at 75° C. for 1 hour and 125° C. for 1 hour under autogenous pressure. The total reaction mass was removed from the bomb and heated at 150° C. under 0.15 mm. pressure to recover the volatile reaction product. Distillation of the latter gave 2 g. of a fraction (I) boiling at 58° C. at 760 mm. and 10 g. of a fraction (II) boiling at 106–108° C. at 760 mm.

Fraction (I) was identified by nuclear magnetic resonance and elemental analysis as N-chloro(ω-hydroperfluoropropylidene)imine, $HCF_2CF_2CF=NCl$, obtained in 8% conversion.

*Analysis.*—Calc'd for $C_3HF_5ClN$: F, 52.30; Cl, 1960. Found: F, 52.49; Cl, 18.85.

Fraction (II) was identified in the same manner as ω-hydroperfluoroazopropane, $H(CF_2)_3N=N(CF_2)_3H$, obtained in 43% conversion.

*Analysis.*—Calc'd for $C_6H_2F_{12}N_2$: F, 69.09; N, 8.49. Found: F, 68.83; N, 8.73.

E. ω-HYDROPERFLUOROAZOPENTANE

A mixture of 39 g. of ω-hydroperfluoropentanenitrile, $H(CF_2)_4CN$, 60 g. of silver(I) fluoride and 12 g. of chlorine was heated under autogenous pressure at 75° C. for 1 hour and 125° C. for 1 hour. A 17-g. liquid portion was removed from the total reaction product, and another 18-g. portion of liquid reaction product was recovered by heating the solids at 125° C. under 1–2 mm. pressure. Distillation of the combined liquids gave 11 g. of a fraction (I), a colorless liquid boiling at 100–102° C. at 760 mm., and 17 g. of a fraction (II), a yellow liquid boiling at 112–115° C. at 28 mm.

Fraction (I) was identified by nuclear magnetic resonance and elemental analysis as N-chloro-(ω-hydroperfluoropentylidene)imine, $H(CF_2)_4CF=NCl$, obtained in 23% conversion.

*Analysis.*—Calc'd for $C_5HF_9ClN$: F, 60.75; Cl, 12.61. Found: F, 60.54; Cl, 12.76.

Fraction (II) was identified in the same manner as ω-hydroperfluoroazopentane, $H(CF_2)_5N=N(CF_2)_5H$, obtained in 37% conversion.

*Analysis.*—Calc'd for $C_{10}H_2F_{20}N_2$: F, 71.70. Found: F, 71.55.

Other suitable polyfluoroazoalkanes which can be prepared by the same general procedure include perfluoroazoisobutane, $(CF_3)_2CFCF_2N=NCF_2CF(CF_3)_2$; ω-hydroperfluoroazononane, $(H(CF_2)_9N=N(CF_2)_9H$; perfluoroazodecane, $CF_3(CF_2)_9N=N(CF_2)_9CF_3$; ω-hydroperfluoroazotridecane, $H(CF_2)_{13}N=N(CF_2)_{13}H$; and the like.

The process of this invention is carried out simply by maintaining the fluoroazoalkane in contact with the metal carbonyl at reaction temperature. The relative proportions of the two reactants are not critical. They are important only to the extent that it is generally desired to utilize as much as possible of the fluoroazoalkane. In practice, the reactants are normally used in such proportions that there is present between 0.2 and 2.0 gram atom of metal (as the metal carbonyl) per mole of fluoroazoalkane, although lesser or greater amounts of metal carbonyl can be used if desired.

A solvent or diluent is not necessary, but it is sometimes advantageous to use one, e.g., when the chosen metal carbonyl is solid at the operating temperature, or when the reaction is conducted at relatively low temperature and under atmospheric pressure. Any organic solvent which is substantially inert towards the reactants and reaction products can be used, the most suitable ones being the aliphatic and cycloaliphatic hydrocarbons, acyclic and cyclic ethers, tetramethylene sulfone, and the like.

The reaction takes place at temperatures as low as about 15° C., and therefore it can be conducted at ordinary room temperature. Of course, it proceeds faster at higher temperatures, and it is in general preferred to operate at temperatures of at least 25° C., the preferred temperature range being that between 50 and 200° C. Higher temperatures, e.g., up to 300° C., can be used if desired, especially at short reaction times, e.g., in continuous flow systems.

Depending upon the volatility of the reactants and the desired temperature, the reaction can be conducted at atmospheric pressure, if necessary under reflux conditions, or in sealed vessels under the autogenous pressure developed by the reactants and reaction products. In either case, a solvent may optionally be used, and stirring or external agitation is advantageous, though not essential. Alternatively, a mixture of the two reactants in suitable proportions can be passed through a reaction zone heated to the desired temperature, with recycling of the effluent gas if necessary. A flow system of this kind is preferably operated at atmospheric pressure, but subatmospheric or superatmospheric pressures can be used if desired. These various modes of practicing the process are illustrated in the examples which follow.

The reaction times will, of course, vary with the conditions used and the reactivity of the starting materials. At ordinary or moderate temperatures, e.g., in the range of 15 to 75° C., reaction times of 12–24 hours may be necessary for high conversions, whereas from a few minutes to 4–8 hours are sufficient at higher temperatures. In flow systems, the contact time may be very short, e.g., from 1 to 60 seconds.

Depending on their molecular weight, the bis(fluoroalkylidene)azines of this invention range in physical properties from normally liquid to normally solid products. They can be isolated from the metal fluoride formed in the reaction and unreacted metal carbonyl, if any, by conventional procedures such as distillation under atmospheric or reduced pressure, solvent extraction, and the like. Their boiling points are close to those of the starting fluoroazoalkanes. Nevertheless, they can be separated from any unreacted fluoroazoalkane that may be present by efficient fractionation or by other methods such as vapor phase chromatography. For most uses of the bis(fluoroalkylidene)azines, the presence of minor amounts of fluoroazoalkane is not detrimental.

The invention is illustrated in greater detail by the following examples. In these examples all pressures are autogenous unless otherwise noted.

*Example I*

An 80-ml. shaker tube charged with a mixture of 36.6 g. (0.1 mole) of perfluoroazopropane and 17.1 g. (0.1 mole) of nickel tetracarbonyl was heated for 6 hours at 170° C. with agitation. Distillation of the volatile reaction product in a low temperature still gave 20 g. (61% conversion) of a liquid boiling at 35° C. at 131 mm. pressure, which was shown by elemental analysis to be bis(perfluoropropylidene)azine, $C_2F_5CF=N-N=CFC_2F_5$.

*Analysis.*—Calc'd. for $C_6F_{12}N_2$: C, 21.95; F, 69.1. Found: C, 22.92; F, 69.08.

The structure of the product was confirmed by its nuclear magnetic resonance spectrum, showing three types of fluorine in the ratio of 3:2:1, and by its infrared spectrum showing absorption at 5.8μ attributable to the CF=N double bond.

*Example II*

An 80-ml. shaker tube charged with 18.3 g. (0.05 mole) of perfluoroazopropane, 8.6 g. (0.025 mole) of dicobalt octacarbonyl and 10 ml. of methylcyclohexane was heated with agitation for 4 hours at 150° C. and 4 hours at 200° C. The liquid reaction product was separated from the higher boiling solvent by distillation at atmospheric pressure and was obtained as the following fractions:

(1) B.P. 70–74° C., 4.97 g.
(2) B.P. 74–76° C., 1.21 g.
(3) B.P. 76–76.5° C., 2.37 g.

This distillate was shown to be bis(perfluoropropylidene)azine by comparison of its n-m-r and infrared spectra with those of the product of Example I. The first fraction was shown by vapor phase chromatography to contain 97% of bis(perfluoropropylidene)azine. The third fraction was similarly shown to be the essentially pure material (99.6% purity).

*Example III*

A mixture of 18.3 g. (0.05 mole) of perfluoroazopropane and 9.8 g. (0.05 mole) of iron pentacarbonyl was passed at atmospheric pressure over a period of 45 minutes through a nickel tube, 60 cm. long and 2.5 cm. inside diameter, one-half the length of which was heated at 191° C. The effluent gas was then condensed in a trap cooled to −78° C. Since the reaction product from one pass was found to contain unreacted iron pentacarbonyl, it was run again over a period of 3 hours through the same tube heated at 200° C. Distillation of the condensate yielded 10.43 g. of product boiling at 72–76° C., which was shown by gas chromatography to contain 68.9% of bis(perfluoropropylidene)azine. This corresponds to a 44% conversion of the perfluoroazopropane.

*Example IV*

A mixture of 9.98 g. (0.02 mole) of perfluoroazobutane, 3.42 g. (0.01 mole) of dicobalt octacarbonyl and 20 ml. of hexane was stirred at 24–26° C. under atmospheric pressure for about 16 hours, then heated for 1 hour at 45° C. The solvent was removed by distillation at atmospheric pressure, and the residue was fractionated under reduced pressure. There was obtained 2.86 g. of material boiling at 47° C. at 41 mm. pressure, which was shown by vapor phase chromatography to consist of 89% of bis(perfluorobutylidene)azine, $$C_3F_7CF=N-N=CFC_3F_7$$

and 11% of unreacted perfluoroazobutane. The purified material was identified by elemental analysis.

*Analysis.*—Calc'd. for $C_8F_{16}N_2$: C, 22.45; F, 71.0; N, 6.54. Found: C, 22.95; F, 70.96; N, 6.03.

Its structure was confirmed by its n-m-r spectrum, showing four types of fluorine in the ratio 3:2:2:1, and its infrared spectrum showing a sharp absorption at 5.83μ, indicative of a C=N double bond.

*Example V*

Bis(perfluorobutylidene)azine was obtained in 27% conversion by heating a stirred mixture of 28 g. (0.064 mole) of perfluoroazobutane and 3.92 g. (0.02 mole) of iron pentacarbonyl for 6 hours at 100° C. under atmospheric pressure. It was also obtained with a better conversion (67%) by heating the same reactants, in approximately equimolar amounts, for 4 hours at 160° C. in a shaker tube under autogenous pressure. The product, which is identical with that of Example IV, boils at 114–116° C. at 760 mm. pressure.

*Example VI*

An 80-ml. shaker tube charged with 21.2 g. (0.04 mole) of ω-hydroperfluoroazopentane and 9.8 g. (0.05 mole) of iron pentacarbonyl was heated at 160° C. with agitation for 4 hours. There was recovered 17 g. of liquid reaction product which contained a small amount of solid. The solid was removed by filtration and the liquid was distilled under reduced pressure to give 13.8 g. (70% conversion) of bis(ω-hydroperfluoropentylidene)azine, $$H(CF_2)_4CF=N-N=CF(CF_2)_4H$$

B.P. 74–80.5° C. at 14 mm. pressure. On refractionation, the purified product boiled at 82–82.5° C. at 14 mm. pressure.

*Analysis.*—Calc'd for $C_{10}H_2F_{18}N_2$: F, 69.51; N, 5.69. Found: F, 69.85; N, 5.22.

The infrared spectrum showed an absorption at 5.86μ characteristic of the carbon-nitrogen double bond, and at 3.3μ characteristic of the ω-hydrogen.

Other bis(fluoroalkylidene)azines which can be prepared by following the general procedure described in the foregoing detailed examples include bis(perfluoroisobutylidene)azine, $(CF_3)_2CF-CF=N-N=CF-CF(CF_3)_2$; bis(perfluorooctylidene)azine, $$C_7F_{15}CF=N-N=CFC_7F_{15}$$

bis(ω-hydroperfluorononylidene)azine, $$H(CF_2)_8CF=N-N=CF(CF_2)_8H$$

bis(perfluorodecylidene)azine, $$CF_3(CF_2)_8CF=N-N=CF(CF_2)_8CF_3$$

bis (ω-hydroperfluorotridecylidene)azine, $$H(CF_2)_{12}CF=N-N=CF(CF_2)_{12}H$$

and the like. These and other products of this invention have the general formula X—CF=N—N=CF—X, where X is a perfluoroalkyl or ω-hydroperfluoroalkyl radical of at least two carbon atoms. The most accessible, and therefore preferred products are those in which X in the above formula is a perfluoroalkyl or ω-hydroperfluoroalkyl radical of 2 to 12 carbon atoms.

The above-defined bis(fluoroalkylidene)azines find a variety of technical uses. Thus, they are effective initiators for the polymerization of ethylenically unsaturated compounds, in particular ethylenic hydrocarbons and halohydrocarbons such as ethylene, propylene, isobutylene, styrene, tetrafluoroethylene, vinyl chloride, vinyl fluoride, vinylidene chloride, vinylidene fluoride, hexafluoropropylene; vinyl carboxylates such as vinyl acetate, vinyl propionate, vinyl benzoate, vinyl laurate; arcylic esters and nitriles such as ethyl acrylate, methyl methacrylate, acrylonitrile, methacrylonitrile; and the like. For such use, the bis(fluoroalkylidene)azines need be used only in catalytic amounts, e.g., from about 0.001% to about 5% by weight of the total monomer charge. They have the advantage over initiators of the peroxide type of being stable to shock and safe to handle and of yielding polymers which are free of oxygen and reactive end groups.

The bis(fluoroalkylidene)azines of this invention are also efficient catalysts for the telomerization of ethylene in the presence of alkanoic acids having hydrogen on the alpha carbon atom, such as acetic, propionic, butyric, isobutyric and higher alkanoic acids. This process, which is carried out under pressure at temperature in the range of 150–300° C., leads to long chain acids having, for example, an average number of carbon atoms between 8 and 40, which are useful, in the form of their sodium or other alkali metal salts, as detergents and emulsifying agents. In this use, the bis(fluoroalkylidene)azines are employed in catalytic amounts, e.g., 0.001–1% based on the weight of the total reactants.

Another use for the bis(fluoroalkylidene)azines is based on their property of absorbing radiation in the ultraviolet range. Thus, they are useful as components of transparent light filters capable of absorbing ultraviolet rays. Such filters can be solutions of the bis(fluoroalkylidene)azine in organic solvents, or films of organic polymers, e.g., cellulose acetate or polyethylene, having incorporated therein a bis(fluoroalkylidene)azine, preferably one having a low vapor pressure at normal temperature. The filters are useful in photography, optical instruments, welders' eyeshields, wrapping materials for food products, etc.

The products of this invention are readily convertible to compounds of a different class, the bis[(α-alkoxy)fluoroalkylidene]azines and bis[(α,β-dialkoxy)fluoroalkylidene]azines. These fluorinated ethers containing an azino group are also a new class of compounds. They are prepared by reaction of the bis(fluoroalkylidene)azines with an appropriate alkali metal alkoxide. In this reaction, the principal transformation is the replacement of the fluorine atom attached to each of the doubly bonded carbon atoms by an alkoxy group to give a bis[(α-alkoxy)fluoroalkylidene]azine. To a lesser extent, there is also replacement of one of the fluorine atoms attached to each of the carbon atoms in beta position with respect to the azino nitrogens, this resulting in a bis[(α,β-dialkoxy)fluoroalkylidene]azine. The reaction is represented by the following (not balanced) equation, using as illustrative reactants a bis(fluoroalkylidene)azine $$X—CF_2—CF=N—N=CF—CF_2—X$$

and a sodium alkoxide NaOR:

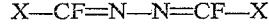

In the above equation and formulas, R can be any alkyl group, preferably a lower alkyl of 1–6 carbon atoms, e.g., methyl, ethyl, propyl, isopropyl, butyl, sec.-butyl, hexyl, etc.; it can also be an aryl group, e.g., phenyl; or an aralkyl group, e.g., benzyl; or a cycloalkyl group, e.g., cyclohexyl. The bis(alkoxyfluoroalkylidene)azines absorb radiation in the ultraviolet range and are useful as components of transparent light filters.

The following example illustrates the preparation of typical bis(alkoxyfluoroalkylidene)azines:

To a stirred mixture of 12.7 g. (0.039 mole) of bis-(perfluoropropylidene)azine in 60 ml. of anhydrous diethyl ether in a vessel blanketed with dry nitrogen was added 4.75 g. (0.088 mole) of dry sodium methoxide at a rate sufficient to keep the solvent refluxing. After stirring for 1 hour, the mixture was allowed to stand at 24–26° C. for 16 hours. The inorganic solids were separated by filtration and the filtrate, after removal of the solvent and unreacted starting material, was fractionated under reduced pressure. The following fractions were obtained:

I. 5.46 g., B.P. 64–66° C. at 25 mm.
II. 1.34 g., B.P. 117–119° C at 25 mm.

Fraction (I) was bis[(α-methoxy)perfluoropropylidene]azine,

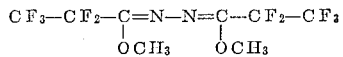

*Analysis.*—Calc'd for $C_8H_6F_{10}N_2O_2$: C, 27.27; H, 1.70; F, 53.97; N, 7.95. Found: C, 27.95; H, 1.93; F, 54.93; N, 7.83.

Fraction (II) was bis[(α,β-dimethoxy)perfluoropropylidene]azine,

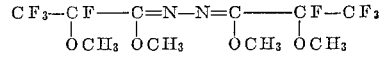

*Analysis.*—Calc'd for $C_{10}H_{12}F_8N_2O_4$: C, 31.91; H, 3.19; F, 40.44; N, 7.45. Found: C, 31.95; H, 3.15; F, 42.47; N, 7.51.

The infrared spectra of both compounds were consistent with the assigned structures, showing absorption at 6.05μ (C=N), 3.35 and 3.5μ (saturated C—H) and in the 7.6–9μ region (C—F).

Since obvious modifications and equivalents in the invention will be evident to those skilled in the chemical arts, I propose to be bound solely by the appended claims.

The embodiments of the invention in which an exclusive property or privilege is claimed are defined as follows:

1. Compounds of the general formula $$X—CF=N—N=CF—X$$

wherein X is selected from the group consisting of perfluoroalkyl of 2–12 carbons and ω-hydroperfluoroalkyl of 2–12 carbons.

2. Bis(perfluoropropylidene)azine.
3. Bis(perfluorobutylidene)azine.
4. Bis(ω-hydroperfluoropentylidene)azine.
5. The process of preparing a bis(fluoroalkylidene)azine which comprises reacting, at a temperature of about 15–300° C., a carbonyl of a metal selected from groups VI-B, VII-B and VIII of the periodic table and a polyfluoroazoalkane of the formula $X—CF_2—N=N—CF_2—X$ wherein X is selected from the group consisting of perfluoroalkyl of 2–12 carbons and ω-hydroperfluoroalkyl of 2–12 carbons.
6. The process of preparing bis(perfluoropropylidene)azine which comprises reacting, at a temperature of about 15–300° C., a carbonyl of a metal selected from groups VI-B, VII-B and VIII of the periodic table and perfluoroazopropane.
7. The process of claim 6 wherein the metal carbonyl is nickel carbonyl.
8. The process of claim 6 wherein the metal carbonyl is cobalt carbonyl.
9. The process of claim 6 wherein the metal carbonyl is iron carbonyl.
10. The process of preparing bis(perfluorobutylidene)azine which comprises reacting, at a temperature of about 15–300° C., a carbonyl of a metal selected from groups VI-B, VII-B and VIII of the periodic table and perfluoroazobutane.
11. The process of claim 10 wherein the metal carbonyl is iron carbonyl.

12. The process of preparing bis(ω-hydroperfluoropentylidene)azine which comprises reacting, at a temperature of about 15–300° C., a carbonyl of a metal selected from groups VI–B, VII–B and VIII of the periodic table and ω-hydroperfluoroazopentane.

13. The process of claim 12 wherein the metal carbonyl is iron carbonyl.

References Cited in the file of this patent

UNITED STATES PATENTS

| | | |
|---|---|---|
| 2,643,267 | Pearlson et al. | June 23, 1953 |
| 2,751,414 | Miller | June 19, 1956 |
| 2,889,333 | Coker et al. | June 2, 1959 |

OTHER REFERENCES

Attaway: J.A.C.S., volume 81, pages 3599 to 3604 (1959).